United States Patent [19]

Gerbe

[11] Patent Number: 5,453,854
[45] Date of Patent: Sep. 26, 1995

[54] DEVICE TO CHECK THE POSITION AND ORIENTATION OF A MIRROR

[75] Inventor: Jean-Pierre Gerbe, Pessac, France

[73] Assignee: Sextant Avionique, Meudon La Foret, France

[21] Appl. No.: 220,678

[22] Filed: Mar. 31, 1994

[30] Foreign Application Priority Data

Apr. 9, 1993 [FR] France .................................. 93 04260

[51] Int. Cl.$^6$ ............................................ G02B 5/30
[52] U.S. Cl. ................... 359/13; 359/1; 359/15; 359/630
[58] Field of Search .................. 359/1, 3, 8, 13, 359/14, 15, 630, 634, 636, 572; 356/139, 363; 250/201.1

[56] References Cited

U.S. PATENT DOCUMENTS

| | | |
|---|---|---|
| 4,439,755 | 3/1984 | LaRussa . |
| 4,600,271 | 7/1986 | Boyer et al. . |
| 4,697,879 | 10/1987 | Gerbe . |
| 4,712,851 | 12/1987 | Fusek et al. . |
| 4,775,218 | 10/1988 | Wood et al. . |
| 5,050,962 | 9/1991 | Monnier et al. . |
| 5,103,323 | 4/1992 | Magarinos et al. ................ 359/15 |
| 5,153,419 | 10/1992 | Takahashi ...................... 250/201.1 |
| 5,164,848 | 11/1992 | Firth et al. ...................... 359/13 |
| 5,172,002 | 12/1992 | Marshall ........................ 250/201.1 |
| 5,172,222 | 12/1992 | Plantier et al. . |
| 5,204,666 | 4/1993 | Aoki et al. ...................... 359/13 |
| 5,212,375 | 5/1993 | Goto et al. ...................... 359/15 |
| 5,243,450 | 9/1993 | Gerbe et al. . |
| 5,258,861 | 11/1993 | Tsuchiya ........................ 359/15 |
| 5,260,829 | 11/1993 | Cantaloube et al. . |
| 5,274,479 | 12/1993 | Zmek et al. . |

FOREIGN PATENT DOCUMENTS

| | | |
|---|---|---|
| 0287032 | 10/1988 | European Pat. Off. . |
| 0479439 | 4/1992 | European Pat. Off. . |
| 0526067 | 2/1993 | European Pat. Off. . |
| 1387946 | 3/1975 | United Kingdom . |
| 1451310 | 9/1976 | United Kingdom . |

OTHER PUBLICATIONS

Patent Abstracts of Japan, "Infrared Cathode Ray Tube", vol. 9, No. 85, (E–308), Apr. 23, 1985. & JP–A–59 215 644 (Hitachi), Dec. 5, 1984.

*Primary Examiner*—Paul M. Dzierzynski
*Attorney, Agent, or Firm*—Oblon, Spivak, McClelland, Maier & Neustadt

[57] ABSTRACT

To servocontrol the direction and the position of a collimation mirror of a head-up visor, holographic elements are used. These holographic elements deflect a part of the light reflected by the mirror towards sensors located outside the field of view.

12 Claims, 3 Drawing Sheets

DEVICE TO CHECK THE POSITION AND ORIENTATION OF A MIRROR

BACKGROUND OF THE INVENTION

1. Field of the Invention

The present invention relates to a device for checking the position and the orientation of a mirror.

When a movable mirror is used in an optical device placed in a cluttered environment, and when the image reflected by this mirror has to be positioned with high precision, it may be difficult or even impossible to use standard image pick-up means (such as sensors or path-changing mirrors) to give a value of the position and orientation of this mirror to its positional servocontrol device.

This is, in particular, the case with a head-up collimator whose combiner mirror is mobile. A head-up collimator has synthetic images and various items of information superimposed on the outside scene in an aircraft pilot's or helicopter pilot's field of view. All these information elements are used for piloting and must be placed with precision in relation to the axes of the aircraft.

The optical system of such a collimator is generally constituted by a collimation optical system and a combiner mirror. In the case of a collimator for transport aircraft, the combiner mirror is generally movable so that it can be stowed away during the stages in flight when the collimator is not used. It is vital, for reasons of flight safety, to be sure of the orientation and position of this mirror when the collimator is used.

2. Description of the Prior Art

Two types of optical systems for collimators are known:

in a first type of system, the combiner mirror is a plane mirror and its only role is to combine or mix synthetic images with the outside scene. In this case, it is only the orientation of the mirror that is important for the precision of the superimposition;

in a second type of system, the combiner mirror is not plane and carries out both the collimation of the synthetic image and its combining with the outside scene. In this case, its orientation and its position affect the precision of the superimposition.

There is a system, known from the U.S. Pat. No. 4,775,218, for detecting the orientation of a head-up mirror based on the principle of self-collimation. This system enables the measurement of the orientation of a combiner mirror but does not give its position. Furthermore, this system uses an ancillary self-collimation mirror. The measurement is therefore not done on the combiner mirror itself.

There is a device, known from the French patent No. 92 14767, for checking the position of a mirror of a head-up visor. This device makes use of an optoelectronic four-quadrant diode-based detector detecting an image dot generated by the collimator itself. This device performs more efficiently than the above-mentioned device because it enables comprehensive control over the entire image-generating electro-optical channel, i.e. not only the right position of the combiner mirror but also the entire electronic part and image source producing the images. However, this device makes it necessary to position the sensor physically in the beam of light rays emerging from the collimator while, at the same time, not obstructing the view of the images. Now, either it is the case that the placing of a sensor or of a path-changing mirror in a device such as a head-up visor greatly hampers vision or else this placing cannot be done.

SUMMARY OF THE INVENTION

An object of the present invention is a device to check the position and the orientation of a mirror that is easy to set up without hampering vision, and is as precise as possible.

The checking device according to the invention has at least one holographic element positioned on the mirror and deflecting a small part of the light beam, after reflection on the mirror, to a corresponding sensor positioned outside the field of view relating to the mirror.

BRIEF DESCRIPTION OF THE DRAWINGS

The present invention will be understood more clearly from the following detailed description of an embodiment, taken by way of a non-restrictive example and illustrated by the appended drawings, of which.

MORE DETAILED DESCRIPTION

The invention is described here below with reference to a head-up visor, but it is understood that it is not limited to this application alone, and that it can be implemented in various other optical devices wherein the position and the orientation of a mirror need to be controlled with precision.

Figure 1:
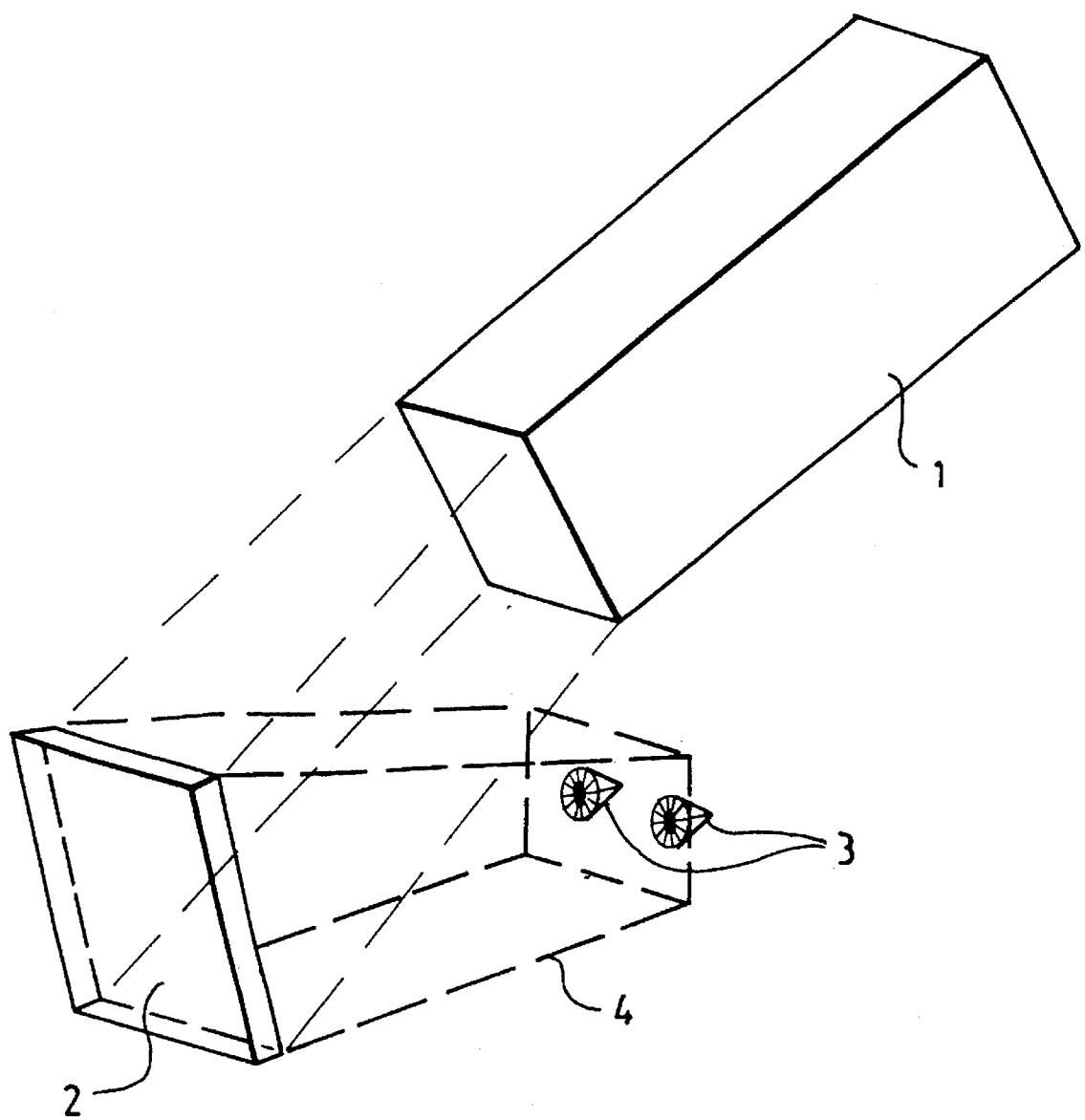
FIG. 1 is a simplified view in perspective of a prior art head-up visor.

The head-up visor shown schematically in FIG. 1 comprises the following elements shown in a non-detailed manner: a source 1 of synthetic images (for example a cathode-ray tube) with its electronic control circuits and a projection objective that forms an image of the source at the focal spot of a spherical combiner mirror 2. This combiner mirror 2 sends an image at infinity towards the user's eyes 3. The architecture of the optical device used is called an architecture with pupil conjugation and restricts the beam of rays emerging from the collimator to a volume (referenced 4 in FIG. 1) neighboring a zone with limited dimensions placed at the level of the user's head.

Major difficulties would arise if it were desired to place a measuring element such as an optoelectronic sensor or a path-changing mirror in this volume 4. Indeed, if this measuring element were to be placed near the user's eyes, it would considerably hamper his view and create a hazard for his head. If this element were to be placed close to the combining mirror, it would mask the beam of rays coming from the source 1 before this beam reached the combining mirror. Furthermore, it would be impossible to use an ancillary mirror since the combining mirror takes part in the collimation, and the measuring element therefore has to be placed after this mirror. Consequently, if the prior art approaches were to be implemented, it would be impossible to place the measuring element at a place where it could pick up the necessary rays and, at the same time, not be an obstacle.

The invention uses a holographic optical element that deflects a small part of the light beam that gets reflected on the combining mirror.

Figure 2:
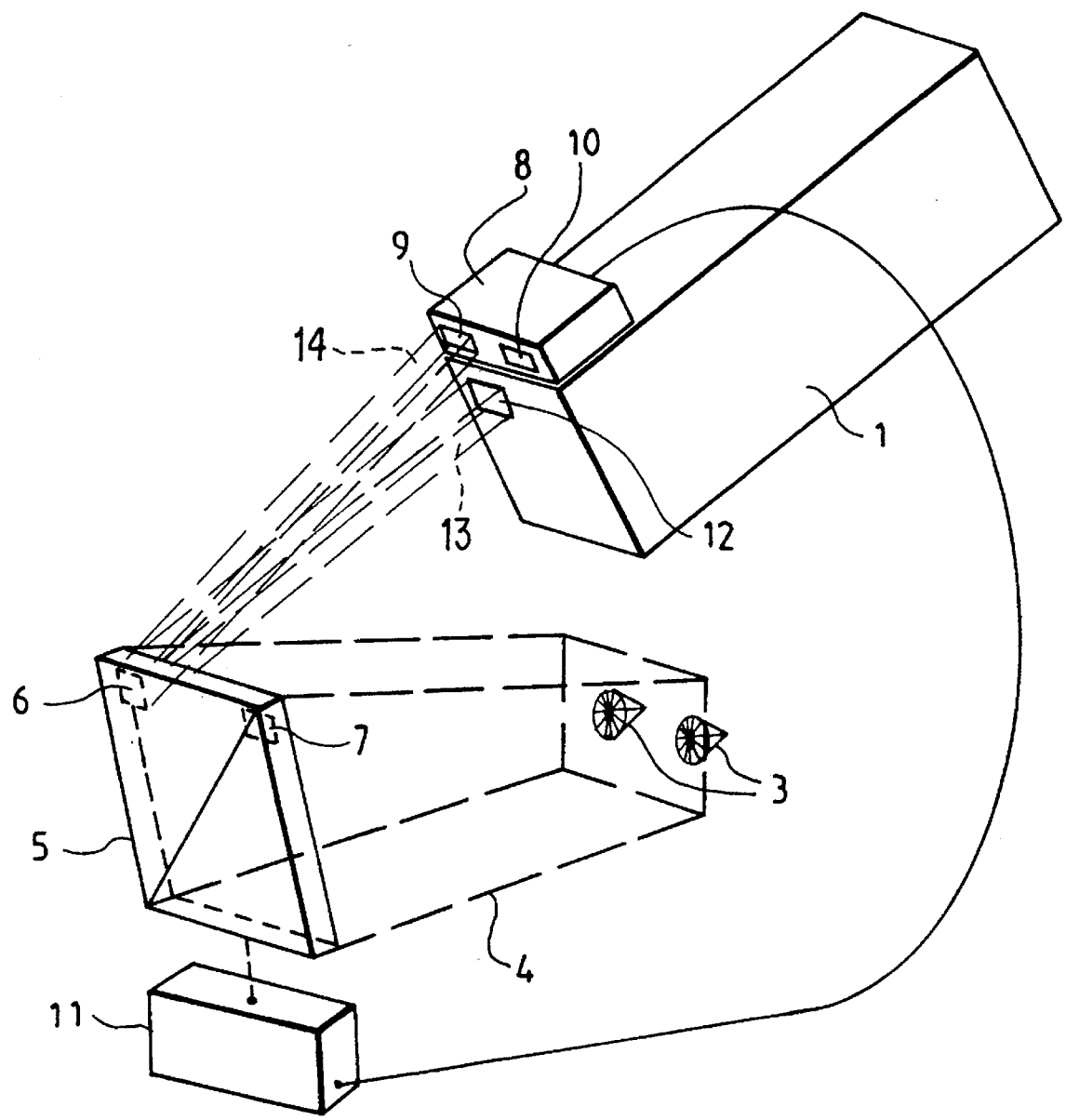
FIG. 2 is a simplified view in perspective of a head-up visor comprising a checking device according to the invention.

FIG. 2 shows a schematic view of a head-up visor comprising a control device according to the invention. In this Figure the same elements as those of the device of FIG.

Figure 3:
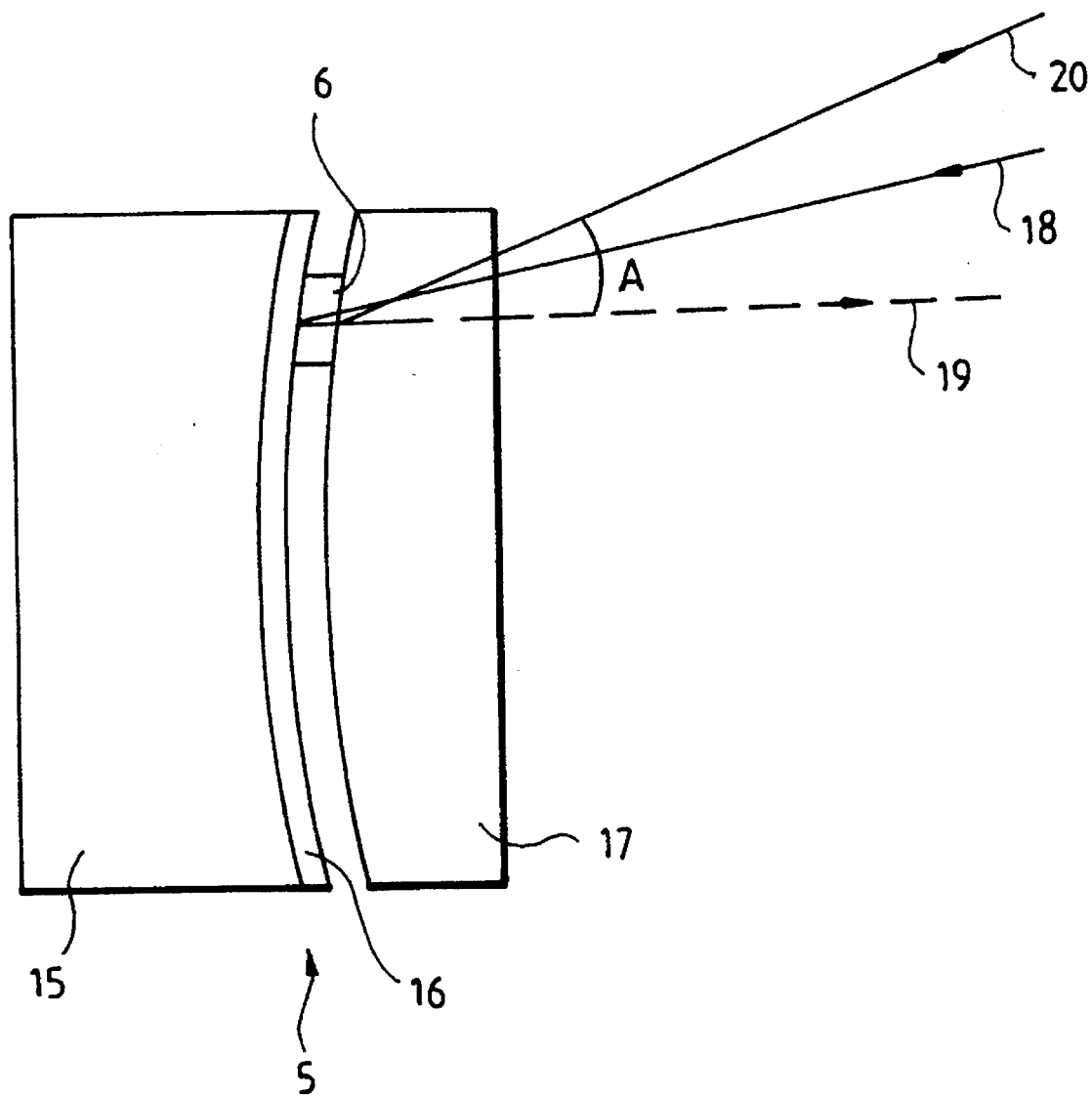
FIG. 3 is a sectional view of the device for checking the position and orientation of a mirror of the visor of FIG. 2.

1 are assigned the same numerical references. The combining mirror 5, which replaces the mirror 2 and has at least one holographic optical element, is described in greater detail here below with reference to FIG. 3. FIG. 2 shows two such holographic elements referenced 6 and 7. These elements 6, 7 are formed or positioned on the face of the mirror 5 that is pointed towards the user. They are positioned for example at the top of this face towards its two corners. On the source 1, for example on its upper part, there is fixed a measurement and checking device 8 with optoelectronic sensors 9, 10 placed at positions corresponding to the positions of the elements 6, 7. The sensors 9, 10 are advantageously of the four-quadrant type described in said French patent No. 92 14767 and are preceded by a focusing lens (not shown). The control signal produced by the device 8 is sent to a device 11 for the servocontrol of the position and/or orientation of the mirror 5 or the servocontrol of the position of the image source 1. The making of the device 8 will be clear to those skilled in the art from a reading of the present description, and shall not be described in greater detail. The device 11 is of a type that is known per se and shall not be described in detail either. FIG. 2 also shows the zone 12 of the outgoing beam from the source 1 which illuminates the element 6 and the paths of the incident beam 13 (coming from the zone 12) and of the beam 14 coming out of the element 6 (to simplify the drawing, the beams pertaining to the element 7 have not been shown).

The mirror 5 (FIG. 3) has a glass substrate 15 which is a portion of a spherical surface. That face of this substrate 15 that is pointed towards the user bears a semi-reflecting coat 16. This coat 16 is, for example, either a hologram or a thin-layer deposit. The holographic element 6 (or 7) is, for example, on a substrate 17 made of glass (or of a material that is transparent to the wavelengths used), bonded to the mirror on the side seen by the user. This holographic element is made by the recording, in a photosensitive material (for example bichromated gelatine), of the interference fringes created by two plane waves that form, between each other, the angle by which the beam is to be deflected (the angle A defined here below).

The device described here above works as follows. A part of the beam (the part corresponding to the zone 12) coming from the source 1, namely the beam 13, pointed in the direction 18, goes through the element 6 without being affected for this type of holographic element acts only at a given wavelength (in this case, the wavelength corresponding to the interference fringes created by the plane waves that have served to record the holographic element) at a given angle of incidence (according to Bragg's law). In the present case, the angle of incidence of the direction 18 is naturally different from the that given by Bragg's law for the holographic element in question. The incident beam 13 gets reflected on the layer 16 and goes through the element 6 with an initial direction 19 (which is that of the beam collimated by the mirror 5 towards the user). This initial direction 19 corresponds precisely to said Bragg's angle. Consequently, instead of emerging from the element 6 in the direction 19, the beam going through this element 6 is deflected in a direction 20, precisely towards the sensor 9. To obtain this deviation, the two above-mentioned plane waves used to record the holographic element constitute, between each other, precisely the angle A that must be had between the directions 19 and 20. Since the hologram is effective only in a very narrow band of wavelengths, it does not obstruct the view of the outside scene in transmission through the mirror 5.

The orientation of the mirror 5 is thus very easy to determine through the position of the image formed by the beam 14 on the element 9 in the manner described in said French patent No. 92 14767. If a second holographic element 7 (co-operating with the detector 10 and working in the same way as the element 6) is used, then it is possible to check not only the orientation of the mirror but also the dimensions of the image that it collimates and, consequently, to check and correct the variations.

The device of the invention can be used to carry out checks on the accurate or inaccurate positioning of the combining mirror as well as on any other error or clearance in the optical system, or any drift of the electronic circuits leading to a shifting of the collimated image. Naturally, the invention can be implemented with other types of mirrors (such as plane mirrors, totally reflecting mirrors etc.).

According to another aspect of the invention, in order to make the beam or beams used for the measurement invisible to the human eye, it is possible to use, in the source 1, a cathode-ray tube having one or more small zones (corresponding to the elements 6 and 7) at the edge of its useful surface that are covered with a phosphor emitting in the infrared band. Naturally, the hologram is then adapted to the infrared wavelength used.

What is claimed is:

1. A device to check the position and orientation of a movable mirror of an optical system, said movable mirror being used to reflect alight beam producing images observed by a user, wherein said device comprises at least one holographic element positioned on the mirror and deflecting a small part of the light beam, after reflection on the mirror, towards a corresponding sensor positioned outside the field of view pertaining to the mirror, wherein the mirror is a combiner mirror and the device forms a part of a head-up visor.

2. A device according to claim 1, wherein the Bragg's angle of each holographic element is the angle formed between the direction in which the mirror normally reflects the incident rays and the direction of the corresponding sensor.

3. A device according to claim 1 or 2, wherein each holographic element is recorded on a layer of photosensitive material deposited on a substrate that is transparent to the wavelengths used and is bonded to the mirror.

4. A device according to claim 1, wherein each sensor is a four-quadrant type of optoelectronic sensor.

5. A device according to claim 1, wherein the combiner mirror is a spherical collimation mirror.

6. A device according to claim 1, wherein the sensor is connected to a device for at least one of the servocontrol of the orientation of the movable mirror and the servocontrol of the position of the image source.

7. A device according to claim 1 wherein, in correspondence with each of said at least one holographic element, the image source comprises, close to the edge of its useful surface, a small zone covered by a phosphor emitting in the infrared band.

8. A device to check the position and orientation of a movable mirror of an optical system, said movable mirror being used to reflect a light beam producing images observed by a user, wherein said device comprises at least one holographic element positioned on the mirror and deflecting a small part of the light beam, after reflection on the mirror, towards a corresponding sensor positioned outside the field of view pertaining to the mirror, wherein in correspondence with each of said at least one holographic element, the image source comprises, close to the edge of its useful surface, a small zone covered by a phosphor emitting in the infrared band and said at least one holographic element acts only on the infrared band and allows visible wavelength light to pass therethrough without being affected.

9. A device for determining alignment in an optical system, comprising:

an optical unit, including:
- a semitransparent mirror; and
- a holographic element which covers only a portion of the mirror and is transparent to a set of light wavelengths, and affects a predetermined wavelength of light passing therethrough, said predetermined wavelength being outside of said set of light wavelengths;

a light emitter for emitting light waves having said predetermined wavelength;

a light receiver which detects light having the predetermined wavelength which is reflected off of the mirror and passes through the holographic element and originates from the light emitter; and alignment determining means which receives a signal from the light receiver and determines an alignment of the optical unit and the light emitter.

10. A device according to claim 11, wherein:

the light emitter emits light at the predetermined wavelength and emits light having wavelengths in said set of light wavelengths at another portion thereof; and light from the light emitter having wavelengths outside of said set of light wavelengths is reflected off of the mirror to a viewer's eyes in order to form a heads-up display.

11. A device according to claim 10, further comprising:

a servo alignment system which adjust a portion of the optical unit using information from the alignment determining means.

12. A device according to claim 9, further comprising:

alignment means, connected to the alignment determining means and the light emitter, for altering the alignment of the optical unit and the light emitter.

\* \* \* \* \*